US009813278B1

(12) United States Patent
Meslelh et al.

(10) Patent No.: US 9,813,278 B1
(45) Date of Patent: Nov. 7, 2017

(54) QUADRATURE SPATIAL MODULATION SYSTEM

(71) Applicants: Raed Meslelh, Amman (JO); Salama Ikki, Ontario (CA); El-Hadi M. Aggoune, Tabuk (SA)

(72) Inventors: Raed Meslelh, Amman (JO); Salama Ikki, Ontario (CA); El-Hadi M. Aggoune, Tabuk (SA)

(73) Assignee: SENSOR NETWORKS AND CELLULAR SYSTEM CENTER, UNIVERSITY OF TABUK, Tabuk (SA)

( * ) Notice: Subject to any disclaimer, the term of this patent is extended or adjusted under 35 U.S.C. 154(b) by 0 days.

(21) Appl. No.: 14/972,379

(22) Filed: Dec. 17, 2015

Related U.S. Application Data (63) Continuation-in-part of application No. 14/141,004, filed on Dec. 26, 2013, now abandoned.

(60) Provisional application No. 61/897,894, filed on Oct. 31, 2013.

(51) Int. Cl.
  *H04L 27/34* (2006.01)
  *H04B 7/0413* (2017.01)
  *H04B 7/06* (2006.01)

(52) U.S. Cl.
  CPC .......... *H04L 27/34* (2013.01); *H04B 7/0413* (2013.01); *H04B 7/0613* (2013.01); *H04B 7/0682* (2013.01)

(58) Field of Classification Search
  CPC ... H04B 7/0413; H04L 1/0063; H04L 1/0656; H04L 1/006; H04L 5/0003
  See application file for complete search history.

(56) References Cited

U.S. PATENT DOCUMENTS

| | | | |
|---|---|---|---|
| 8,482,465 B1 | 7/2013 | Hemmady et al. | |
| 2005/0287978 A1 | 12/2005 | Maltsev et al. | |
| 2008/0037673 A1* | 2/2008 | Ahn | H04B 7/0413 375/261 |
| 2008/0187066 A1* | 8/2008 | Wang | H04L 1/0003 375/267 |
| 2012/0134433 A1* | 5/2012 | Haas | H04L 5/0003 375/262 |
| 2013/0107791 A1 | 5/2013 | Oh et al. | |

OTHER PUBLICATIONS

R.Y. Mesleh "Spatial Modulation" Jul. 2008, IEEE vol. 57.

* cited by examiner

*Primary Examiner* — Janice Tieu
(74) *Attorney, Agent, or Firm* — Malloy & Malloy, P.L.

(57) ABSTRACT

The invention is directed to systems and methods for quadrature spatial modulation in the transmission of over a wireless network. A plurality of transmit antennas are configured in a spaced apart configuration, with each antenna representative of a spatial constellation symbol comprising an in-phase component and a quadrature component. A transmission unit is configured to map source data to the spatial constellation symbol of the transmit antennas, and to transmit a carrier signal comprising the in-phase and quadrature components out of phase. At least one receiving antenna is configured to receive the carrier signal, and at least one receiving unit is configured to demodulate the carrier signal to generate the source data.

14 Claims, 6 Drawing Sheets

QUADRATURE SPATIAL MODULATION SYSTEM

CLAIM OF PRIORITY

This application is a continuation application of U.S. patent application Ser. No. 14/141,004, filed on Dec. 26, 2013, which claims the benefit of U.S. Provisional Patent Application No. 61/897,894, filed Oct. 31, 2013, the contents of which are herein incorporated by reference.

BACKGROUND OF THE INVENTION

Field of the Invention

The present invention generally relates to improved systems and methods for transmitting different streams of data in separate spatial dimensions in multiple-input and multiple-output (MIMO) wireless networks. Specifically, the present invention utilizes both in-phase and quadrature components in order to improve data transmission rates in various space modulation techniques. Further, some embodiments of the present invention may also use both the in-phase and quadrature components of space modulation in combination with certain signal modulation techniques in order to increase the overall spectral efficiency of network transmissions.

Description of the Related Art

Multiple-input and multiple-output (MIMO) is a technology that uses multiple antennas to coherently resolve more information than is possible using a single antenna. MIMO offers the ability to significantly increase data throughput and link range without requiring additional bandwidth or increased transmission power. This is achieved by spreading the same total transmission power over a plurality of antennas: to (1) achieve an array gain that improves spectral efficiency (more bits per second per hertz of bandwidth); and/or (2) to achieve a diversity gain that improves the reliability of the communication link (reduces fading). Because of these properties, MIMO has become an important part of modern wireless communication standards such as IEEE 802.11n, 802.11ac, 4G, Long Term Evolution (LTE), WiMAX, and HSPA+.

Conventional MIMOs typically use multiple radio frequency (RF) chains, and thus multiple active antennas. Accordingly, one of the drawbacks of conventional MIMOs includes inter-channel interference, which is introduced by coupling multiple symbols in time and space, which increases signal processing complexity. A second drawback is the requirement of inter-antenna synchronization, as detection algorithms require that all symbols are transmitted at the same time. A third drawback is the added energy consumption, which increases linearly along with the number of active antennas required.

To combat these drawbacks, a more recent technique known as space modulation was introduced, including spatial modulation (SM), space shift keying (SSK), and space-time shift keying (STSK). Space modulation generally relates to the use of transmit antennas as spatial constellation points, which are utilized to carry additional information bits. Accordingly, space modulation techniques involve the use of one (or few) active RF chains, and thus fewer active antennas, which alleviates problems such as unnecessary complexity, inter-channel interference, the necessity of synchronization, and increased power consumption. Despite these advantages, one of the major criticisms of space modulation techniques is that the data rate enhancement is limited to the base-two logarithm of the number of transmit antennas available.

Therefore, there is a need in the wireless communication industry for a system and method which can increase the data rate enhancement of space modulation techniques, while preserving the advantages thereof.

SUMMARY OF THE INVENTION

The present invention is directed to a system and method that enhances the overall performance of space modulation techniques. Current space modulation techniques use only the real part of the spatial modulation constellation, whereas the present invention is directed to systems and methods that extend the spatial modulation constellation to both in-phase and quadrature dimensions or components. Accordingly, the achieved transmission data rate is increased, without increasing overall system complexity or degrading system performance due to interference.

In at least one embodiment of the present invention, a system for transmitting source data over a wireless network comprises at least one transmission unit, a plurality of transmit antennas, at least one receiving antenna, and at least one receiving unit. The plurality of transmit antennas is representative of a spatial constellation diagram, with each of the transmit antennas representing a spatial constellation symbol, which may comprise an in-phase component and a quadrature component. As such, the plurality of transmit antennas may comprise a plurality of physical transmit antennas, or alternatively, comprise only a single physical transmit antenna with a plurality of antenna relays. The plurality of transmit antennas may also comprise a single physical antenna representing a plurality of virtual antennas or virtual antenna arrays.

The transmission unit is configured to map source data to at least one spatial constellation symbol and/or the in-phase component or quadrature component of a spatial constellation symbol. In at least one embodiment, the transmission unit may further be configured to modulate the carrier signal to be transmitted by the transmit antennas to represent signal constellation symbols comprising real and imaginary parts, according to a predetermined modulation scheme.

The transmit antennas are configured to transmit the carrier signal, which comprises both in-phase and quadrature components of at least one spatial constellation symbol. The carrier signal may further comprise at least one signal constellation symbol. In at least one embodiment, the real part of the signal constellation symbol may be carried by the in-phase component of the spatial constellation symbol. Similarly, the imaginary part of the signal constellation symbol may be carried by the quadrature component of the spatial constellation symbol.

The at least one receiving antenna is configured to receive the carrier signal. The at least one receiving unit, coupled to the at least one receiving antenna, is configured to demodulate the carrier signal in order to reconstruct or generate the source data that was transmitted at each time interval.

Another embodiment of the present invention is directed to a method for transmitting source data over a wireless network. As such, a plurality of transmit antennas are configured to each represent a spatial constellation symbol, which may comprise both an in-phase component and a quadrature component. The source data is mapped to at least one spatial constellation symbol and/or an in-phase or quadrature component of at least one spatial constellation symbol.

Additionally, the transmission unit may further be configured to modulate a carrier signal to represent a signal constellation symbol comprising a real part and an imaginary part, using a predetermined modulation scheme. The addition of the signal constellation modulation may allow for additional data to be mapped and subsequently transmitted, thus increasing throughput of the system. Accordingly, the carrier signal comprising both the spatial constellation symbol as well as the signal constellation symbol may be transmitted by one or more of a plurality of transmit antennas. The in-phase component and the quadrature component of the spatial constellation symbol may be out of phase, such as by 90 degrees. In at least one embodiment, the in-phase component may carry the real part of the signal constellation symbol, and the quadrature component may carry the imaginary part of the signal constellations symbol.

The carrier signal is then received by at least one receiving antenna. Finally, the carrier signal is demodulated to generate the source data using at least one receiving unit. The receiving unit may be appropriately configured to demodulate the spatial constellation symbols and/or the signal constellation symbols carried or represented by the carrier wave.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying drawings, the present invention is generally directed to a system and method for increasing spectral efficiency in MIMO wireless networks by utilizing both in-phase and quadrature components of each transmitting antenna's constellation symbols. However, before discussing the invention in detail, some background on MIMO wireless networks and space modulation techniques is helpful.

1. Overview

MIMO technique is one of the most important contributions to the progress in wireless communications in recent years. As such, it has been considered in many recent standards such as 3rd Generation Partnership Project, Wireless World Initiative New Radio, Long Term Evolution, 802.11n, 802.11ac, and other standards. The aim of MIMO techniques is to improve power efficiency by maximizing spatial diversity (as in space-time coding), or to boost the data rate by transmitting independent streams from each transmit antenna, for example in V-BLAST (vertical Bell Labs layered space-time), or to achieve both of them at the same time at the expense of increasing complexity.

A more recent MIMO technique, known as space modulation, which includes space shift keying (SSK), spatial modulation (SM) and space-time shift keying (STSK), uses multiple transmit antennas to create spatial multiplexing gains without additional complexity. Spatial modulation (SM) also avoids inter-channel interference (ICI) and requires no synchronization between the transmit antennas.

Specifically, in space modulation, transmit antennas are considered as spatial constellation points and are utilized to carry additional information bits to boost the overall spectral efficiency. Each antenna's index is utilized to carry additional information bits and a spatial multiplexing gain of base-two logarithm of the overall number of transmit antennas is achieved. Furthermore, activating only a single transmit-antenna at a time eliminates inter-channel interference, relaxes inter-antenna synchronization requirements, reduces receiver complexity, and allows the use of a single RF chain at the transmitter. In addition, it has been shown that space modulation techniques enhance error performance with a moderate number of transmit antennas as compared to other conventional MIMO techniques. Additionally, it is demonstrated that these techniques are more robust to channel imperfections, such as spatial channel correlation and channel estimation errors, as compared to conventional MIMO techniques, since the probability of error of space modulation systems is not determined by the actual channel realization, but rather by the differences between channels associated with the different transmit antennas.

Nonetheless, a major criticism of space modulation techniques is that the data rate enhancement is proportional to the base-two logarithm of the number of transmit antennas. This is unlike other spatial multiplexing techniques, such as V-BLAST, where data rate increases linearly with the number of transmit antennas. For instance, an overall spectral efficiency of 4 bits per second per Hertz can be achieved by transmitting BPSK symbols from four transmit antennas in V-BLAST systems. While using the same BPSK modulation order, space modulation techniques requires at least eight transmit antennas.

2. Quadrature Spatial Modulation

Accordingly, it is an object of the present invention to provide new systems and methods directed to improving spectral efficiency of data transmission in space modulation techniques of MIMO systems. Specifically, the present invention expands the single-dimensional spatial constellation points of a conventional spatial dimension used in space modulation to a new dimension. This is accomplished by utilizing in-phase and quadrature components. Accordingly, the achieved data transmission rate of the present invention may double that of conventional space modulated MIMO systems, while preserving the inherent benefits of the conventional space modulated systems. As a result, the present invention is highly beneficial for future wireless systems demanding high data rate at a low cost, with low-complexity transmitter(s) and receiver(s).

Figure 1:
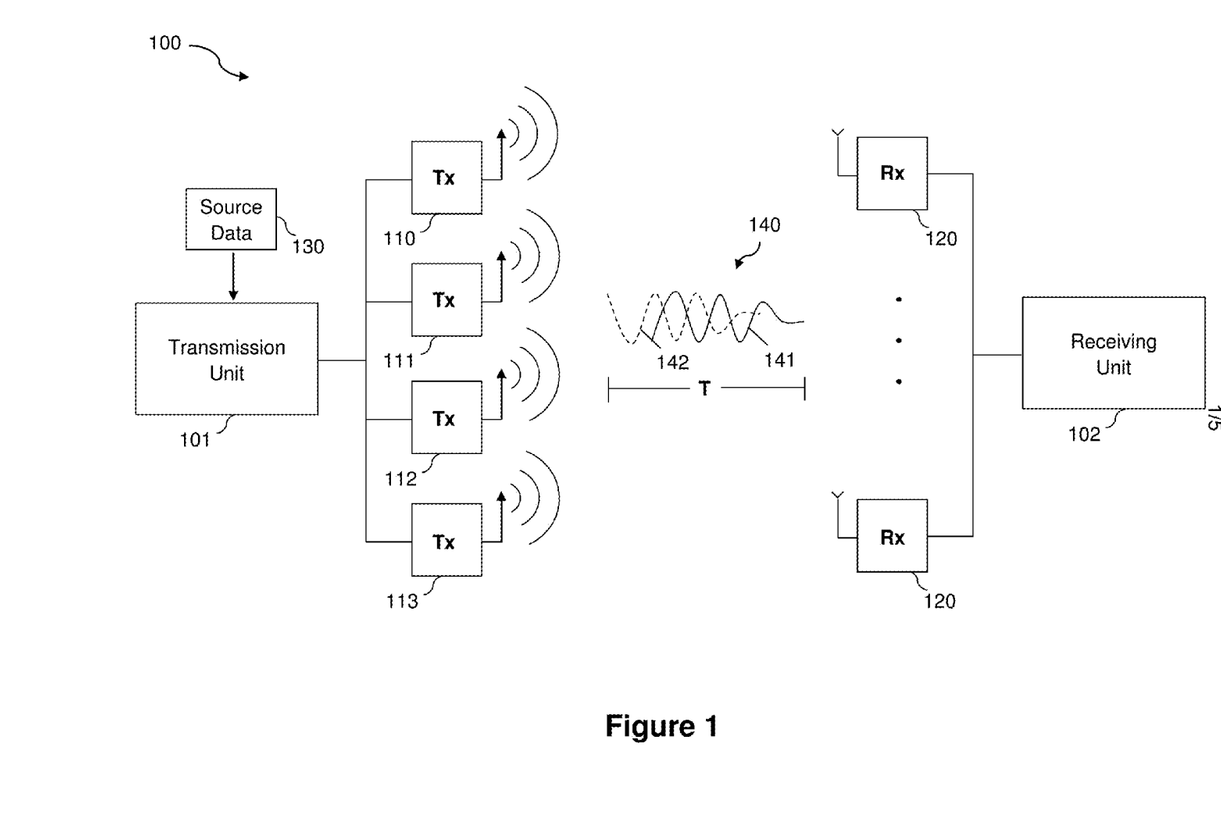
FIG. 1 is a diagrammatic representation illustrating an embodiment of the present invention directed to a system for quadrature spatial modulation.

In at least one embodiment of the present invention, as illustrated in FIG. 1, a system 100 for transmitting source data over a wireless network generally comprises at least one transmission unit 101, a plurality of transmit antennas generally represented by 110-113 configured to transmit a carrier signal 140 with both in-phase 141 and quadrature 142 components, at least one receiving antenna 120, and at least one receiving unit 102.

Figure 2:
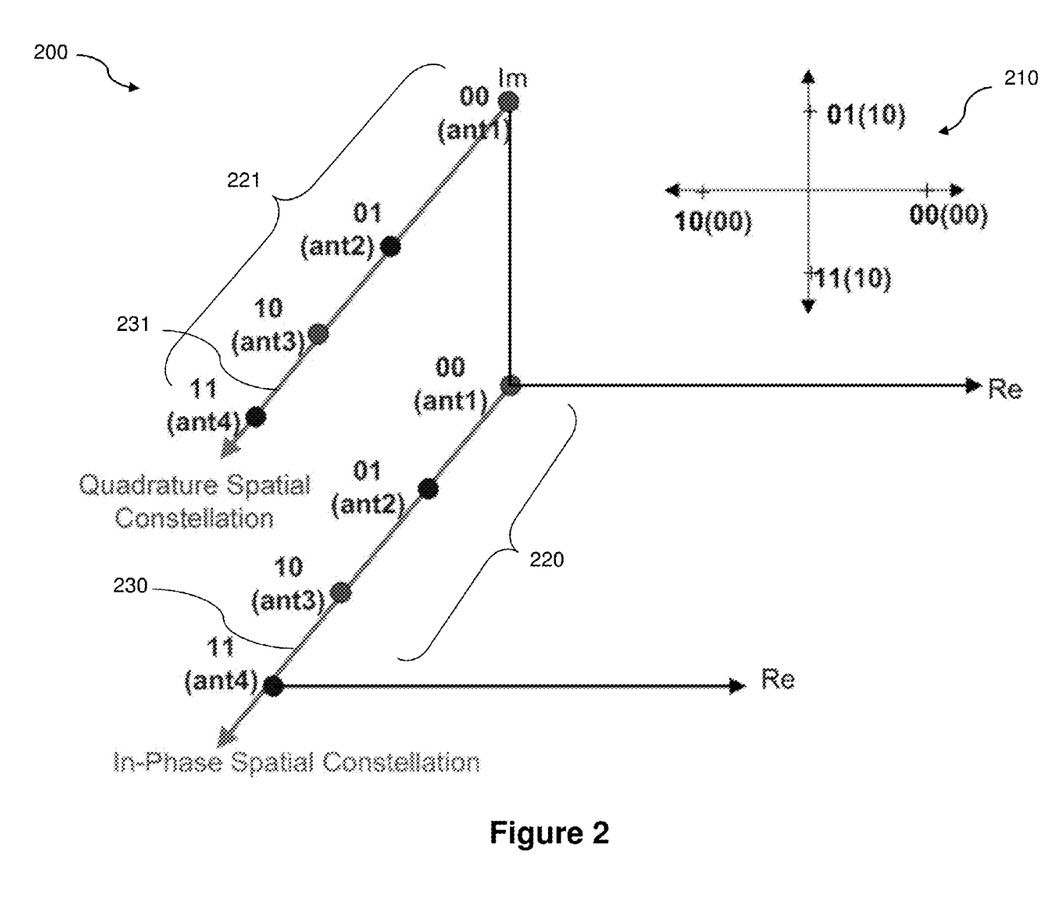
FIG. 2 is visual representation of a constellation diagram representing spatial constellation symbols comprising in-phase and quadrature components, as well as signal constellation symbols directed to at least one embodiment of the present invention.

Each of the plurality of antennas 110-113 is representative of a spatial constellation symbol of a constellation diagram as shown in FIG. 2. For illustrative purposes, four antennas are represented, i.e. ant1 110, ant2 111, ant1 112, and ant4 114. However, it should be understood that the present invention may comprise more or fewer antennas and thus more or fewer spatial constellation symbols. The spatial constellation symbols comprise both in-phase components 220 and quadrature components 221. Further, the plurality of transmit antennas 110-113 may comprise a plurality of physical transmit antennas, or alternatively, comprise only a single physical transmit antenna with a plurality of antenna relays which may be represented by the plurality of antennas 110-113. The plurality of transmit antennas may also comprise a single physical antenna representing a plurality of virtual antennas or virtual antenna arrays, which may also be represented by the plurality of antennas 110-113.

The transmission unit 101, in at least one embodiment of the present invention, is configured to map the source data to one or more of the spatial constellation symbols of at least one of the plurality of transmit antennas 110-113, as illustrated in FIG. 2 which may comprise both in-phase components 220 and quadrature components 221. As such, source data may be mapped to the in-phase component 220 and/or the quadrature component 221 of a spatial constellation symbol. In at least one embodiment, transmission unit 101 may also be configured to modulate the carrier signal 140 to represent signal constellation symbols 210 comprising real parts and imaginary parts using a predetermined modulation scheme. The signal constellation symbols represented by 210 are related to a 4 QAM modulation scheme. However, it should be understood that the present invention may comprise other signal constellations and/or symbols to represent other modulation schemes. Accordingly, the predetermined modulation scheme may comprise quadrature amplitude modulation (QAM) including but not limited to 2 QAM (BPSK), 4 QAM (QPSK), 8 QAM, 16 QAM, . . . 256 QAM etc. The predetermined modulation scheme may also comprise phase shift keying (PSK), pulse amplitude modulation (PAM), discrete multi-tone (DMT), orthogonal frequency division multiplexing (OFDM), time division multiple access (TDMA), frequency division multiple access (FDMA), code division multiple access (CDMA), space division multiple access (SDMA) or any other appropriate modulation schemes as known to those skilled in the art.

Accordingly, the transmission unit 101 may comprise at least one processor and memory module and/or other electronic circuits appropriate for the mapping of source data to spatial constellation symbols representative of a plurality of transmit antennas, and to effect the transmissions thereof. The transmission unit 101 may further comprise electronic circuits appropriate for encoding or to otherwise modulate the carrier signal 140 to represent signal constellation symbols 210 as well as other signal constellation symbols, based on one or more of the predetermined modulation schemes discussed above.

As discussed above, the plurality of transmit antennas, generally represented by 110-113, are representative of a plurality of spatial constellation symbols, which the source data is then mapped to. This may be represented within the transmission unit 101 as an array or index of antennas. For instance, antennas 1, 2, 3, 4 represent the bits or symbols [0 0], [0 1], [1 0], and [1 1] respectively in the example constellation diagram of FIG. 2. Accordingly, an index or array of the same may be kept within the transmission unit 101 and/or other memory or storage. Other appropriate mechanisms or storage and/or mapping of transmit antennas, their representative spatial constellation symbols, as well as the source data may also be used.

As such, various antennas will transmit and will represent spatial constellation symbol(s) at each time instant or interval. In at least one embodiment of the present invention, one or more transmit antennas will transmit a carrier signal 140 comprising both an in-phase component 141 and a quadrature component 142. The in-phase component 141 may represent an in-phase spatial constellation symbol 220, and the quadrature component 142 may represent a quadrature spatial constellation symbol 221. The in-phase component 141 and the quadrature component 142 will be out of phase, and may be out of phase by 90 degrees. In other embodiments, the two components may be out of phase by a degree selected from a range of between 1 to 359 degrees. In at least one embodiment, each of the quadrature 142 and in-phase 141 components may each further represent or carry at least one signal constellation symbol. For instance, the in-phase component 141 may carry a real part of a signal constellation symbol, and the quadrature component 142 may carry an imaginary part of a signal constellation symbol.

The receiving antenna(s) 120 are configured to receive the carrier signal 140 at each time instant or interval, and may also vary in number in the present invention, and may vary based on the predetermined modulation scheme used as well as the number of transmit antennas used.

The receiving unit 102 is coupled to the one or more receives antenna(s) 120 and is configured to demodulate the carrier signal 140 in order to reconstruct or generate the source data 130 that was transmitted at that time instant or interval. Accordingly, the receiving unit 102 may comprise processor(s), memory, and/or appropriate electronic circuitry for demodulating the carrier signal 140. The demodulation may be based on phase, amplitude, distance, unique signatures of each of the plurality of transmit antennas 110-113, or other characteristics known to those skilled in the art. The configuration of the receiving unit 102 may further vary based on the predetermined modulation scheme used, the configuration of the transmission unit 101, the number and configuration of transmit antennas 110-113, as well as the number and configuration of receiving antenna(s) 120.

Figure 3:
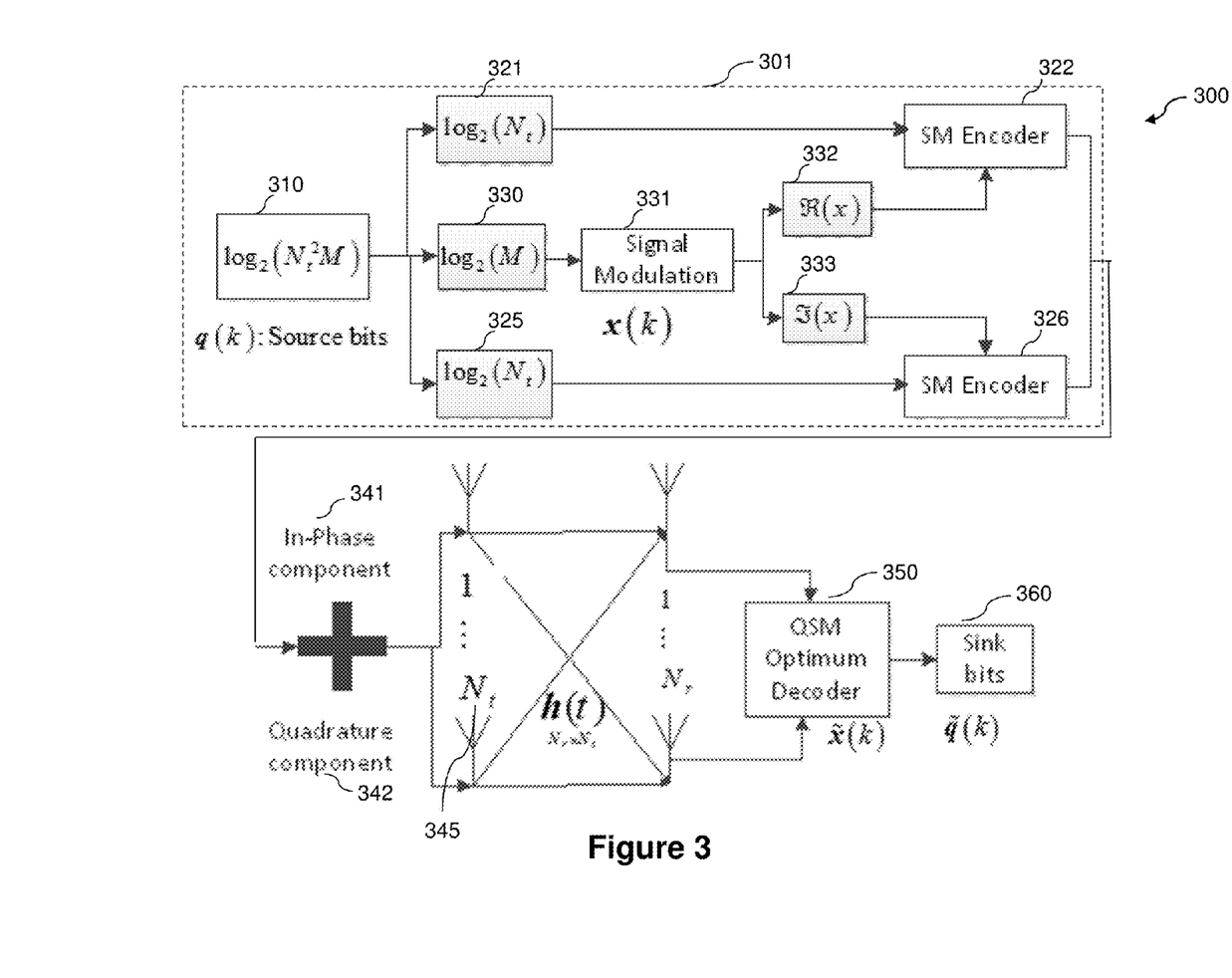
FIG. 3 is a diagrammatic representation illustrating another embodiment of the present invention directed to a system for quadrature spatial modulation.

As illustrated in FIG. 3, one embodiment of the present invention may be directed to another system 300 for wireless communication. Accordingly, system 300 comprise a transmission unit 301, wherein $$\log_2(N_t^2 M)$$

source bits 310 to be transmitted, at each time instant or time interval, are first processed and partitioned into three groups comprising $\log_2(N_t)$ bit(s) 321, $\log_2(N_t)$ bit(s) 325, and $\log_2(M)$ bit(s) 330.

The two $\log_2(N_t)$ bits 321 and 325 modulate corresponding spatial constellation symbols through spatial modulation (SM) encoders 322 and 326 respectively. The spatial constellation symbols may correspond to any one of a plurality of transmit antennas, and may be mapped by the at least one SM encoder, or otherwise by the transmission unit 301 and/or any appropriate circuitry.

Additionally, the $\log_2(M)$ bit(s) 330 may undergo signal modulation through the signal modulation module 331, which may modulate a signal constellation symbol, drawn from an M quadrature amplitude modulation (M QAM), phase shift keying (M PSK), or other constellation diagrams of other predetermined modulation schemes as discussed above. In at least one embodiment, the signal constellation symbol x may further be decomposed to its real part $x_\Re$, and imaginary part via processing modules 332 and 333 respectively. As such, the real part may further be processed by SM encoder 322, such that the real part of the $\log_2(M)$ bit(s) may be carried by the corresponding transmit antenna of the $\log_2(N_t)$ bit(s) 321. Similarly, the imaginary part may further be processed by SM encoder 326, such that the imaginary part of the $\log_2(M)$ bit(s) may be carried by the corresponding transmit antenna of the $\log_2(N_t)$ bit(s) 325.

Accordingly, the real part is transmitted from one transmit antenna among the existing $N_t$ 345 transmit antennas, where the active antenna index is determined by the first $\log_2(N_t)$ bit(s) 321. Similarly, the imaginary part is transmitted by another or the same transmit antenna depending on the other $\log_2(N_t)$ bit(s) 325. Further, the transmitted real and imaginary parts are orthogonal, representing the in-phase 341 and the quadrature 342 components of the carrier signal. The transmission is then received by at least one $N_r$ 346 receiving antenna(s), and is subsequently decoded via the QSM Optimum Decoder 350 to reconstruct or generate the transmission as sink bits 360, which represent the source bits transmitted at each time interval or instant.

The quadrature spatial modulation systems and methods are further illustrated in the following example(s), which are provided by way of illustration and are not intended to be limiting. It will be appreciated that variations in alternatives in elements of the transmission unit, receiving unit, antennas, and both spatial modulation and signal modulation schemes and their respective constellations and/or constellation symbols will be apparent to those skilled in the art and are within the scope of embodiments of the present invention.

An example is given below, where the following incoming data bits are to be transmitted at one particular time instant or interval via quadrature spatial modulation.

$$q = \underbrace{[0\ 1\ 1\ 0\ 1\ 1]}_{\log_2(M)+\log_2(N_t^2)}$$

For this example, a 4 QAM modulation scheme is used with four transmit antennas. The first $\log_2(M)$ bits [0 1] modulate a 4-QAM symbol $x=-1+j$. This symbol is divided further to real and imaginary parts, $$x_\Re = -1$$

and $x_\Im = j$. The second $\log_2(N_t)$ bits [1 0] modulate the active antenna index used, $$l_\Re = 3,$$

to transmit $x_\Re = -1$, resulting in the transmitted vector $$s_\Re = [0\ 0\ -1\ 0]^T.$$

The last $\log_2(N_t)$ bits [1 1] modulate the active antenna index, $l_\Im = 4$, used to transmit $z_\Im = j$, resulting in the vector $s_\Im = [0\ 0\ 0\ j]^T$. The transmitted vector is then obtained by adding the real and imaginary vectors $$s = s_\Re + s_\Im = [0\ 0\ -1\ j]^T.$$

The vector s is transmitted over the MIMO fading channel h and experiences an $N_r$ dimensional additive white Gaussian noise (AWGN) at the receiver input. The received signal is written as the following equation.

$$y = \sqrt{E_S}\,(h_{l_\Re} x_\Re + j h_{l_\Im} x_\Im) + n$$

Where $h_{l_\Re}$ and $h_{l_\Im}$ denote the $l_\Re^{th}$ and $l_\Im^{th}$ columns of the channel matrix h. The optimum quadrature spatial modulation (QSM) decoder aims at jointly detecting the transmitted data symbol and the active transmit antenna indices to retrieve the source information bits as the following equation.

$$[\hat{l}_\Re, \hat{l}_\Im, \hat{x}_\Re, \hat{x}_\Im] = \arg\min_{l_\Re, l_\Im, x_\Re, x_\Im} \left\| y - \sqrt{E_s}\,(h_{l_\Re} x_\Re + j h_{l_\Im} x_\Im) \right\|^2$$

In conventional space modulation techniques, the real and imaginary parts of a constellation symbol are transmitted from a single transmit antenna to avoid inter-channel interference at the receiver. The present invention is also able to achieve this, since the two transmitted data are orthogonal and modulated on the real part and the imaginary part of the carrier signal. However, an additional base-two logarithm of the number of transmit antennas bits can be transmitted in the present invention, as compared to conventional space modulation systems.

Figure 4:
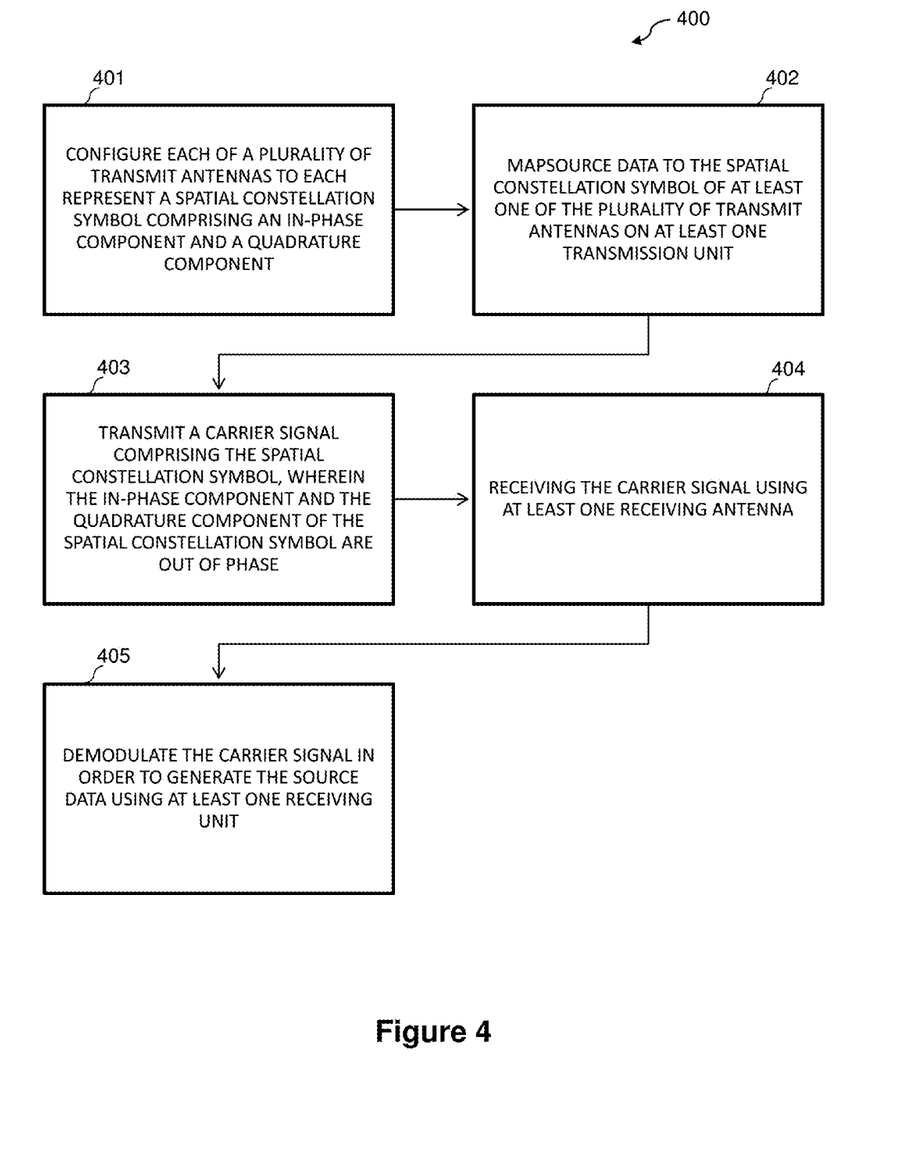
FIG. 4 is a diagrammatic representation of an embodiment of a method in accordance with the present invention.

At least one embodiment of the present invention is directed to a method 400 for transmitting source data over a wireless network, as generally represented by FIG. 4. Accordingly, a plurality of transmit antennas are first configured to each represent a spatial constellation symbol, as in 401. Each spatial constellation symbol may further comprise both an in-phase component and a quadrature component as described above. Next, source data is mapped to the spatial constellation symbol of at least one of the plurality of transmit antennas, as in 402. The mapping may occur on at least one transmission unit, such the transmission unit 101 or 301 as described above. A carrier signal comprising the spatial constellation symbol is then transmitted, as in 403.

The in-phase component and the quadrature component of the spatial constellation symbol may be out of phase. In at least one embodiment, the in-phase and quadrature components are out of phase by 90 degrees. Next, at least one receiving antenna receives the carrier signal, as in 404. Finally, the carrier signal is demodulated in order to generate the source data, as in 405. The demodulation may occur through at least one receiving unit.

Figure 5:
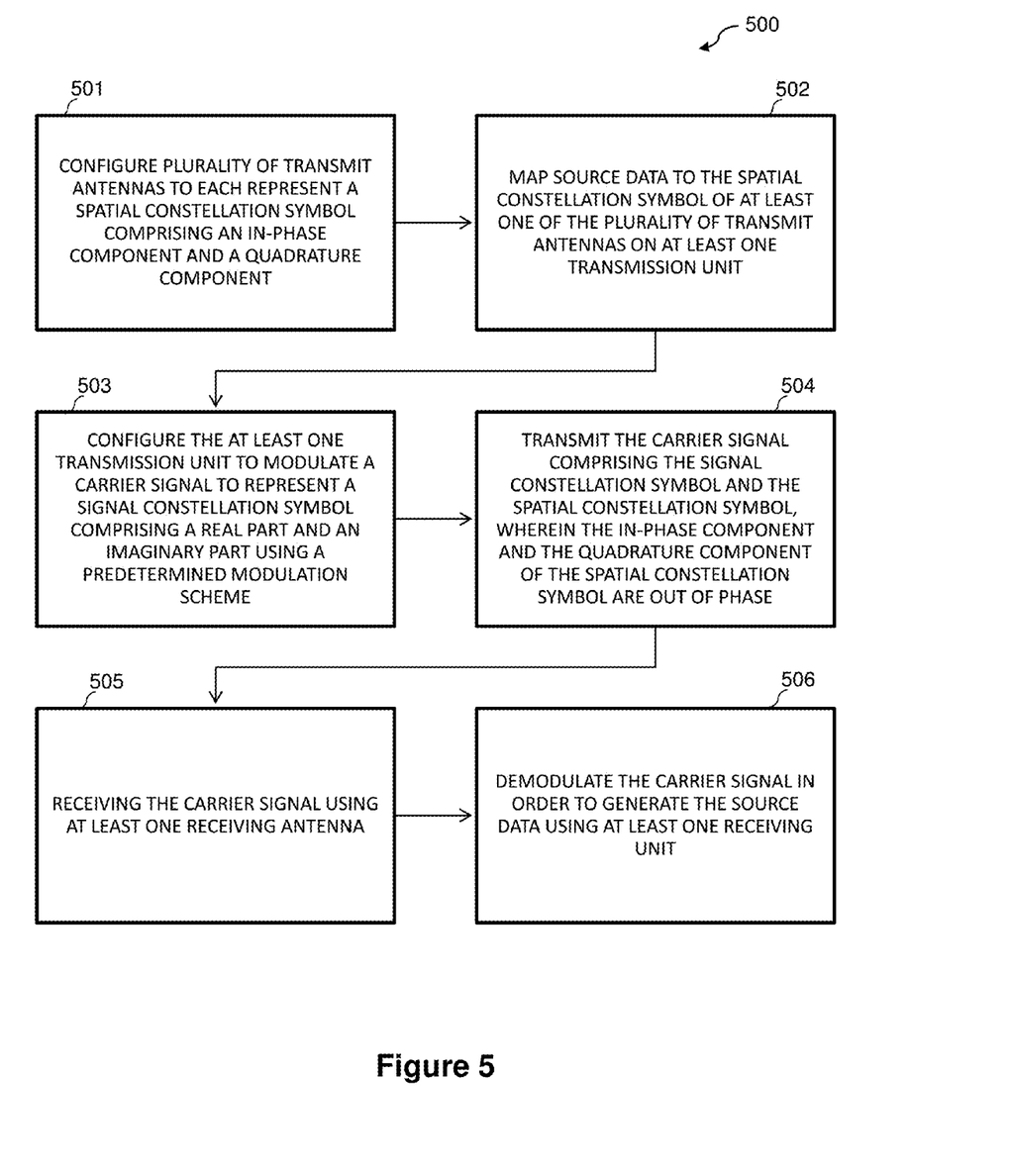
FIG. 5 is a diagrammatic representation of an embodiment of another method in accordance with the present invention.

Another embodiment of the present invention may be directed to a method 500, which may further include the modulation of a signal constellation symbol, as in FIG. 5. As such, a plurality of transmit antennas are similarly configured to each represent a spatial constellation symbol as in 501. The spatial constellation symbol may further comprise both an in-phase component and a quadrature component. The source data is similarly mapped to at least one spatial constellation symbol of at least one of the plurality of transmit antennas on at least one transmission unit, as in 502. The source data may be mapped to an in-phase or quadrature component of at least one spatial constellation symbol.

In addition, the at least one transmission unit may be configured to modulate a carrier signal to represent a signal constellation symbol comprising a real part and an imaginary part, using a predetermined modulation scheme, as in 503. The modulation scheme may comprise QAM, PSK, or any number of modulate schemes and corresponding constellation diagrams and/or symbols as discussed above. The addition of the signal constellation modulation allows additional data to be mapped and/or transmitted. Accordingly, the carrier signal comprising both the spatial constellation symbol as well as the signal constellation symbol may then be transmitted, as in 504. The in-phase component and the quadrature component will be out of phase, such as by 90 degrees. In at least one embodiment, the in-phase component of the spatial constellation symbol and/or carrier signal may carry a part, such as real part, of the signal constellation symbol. The quadrature component of the spatial constellation symbol and/or carrier signal, similarly, may carry a part, such as the imaginary part, of the signal constellation symbol. This effectively allows more data to be transmitted at each time interval.

The carrier signal is then received by at least one receiving antenna, as in 505. Finally, the carrier signal is demodulated to generate the source data using at least one receiving unit, as in 505. The receiving unit may be configured to demodulate both spatial constellation symbols from space modulation as well as signal constellation symbols from signal modulation. For instance, the demodulation may be based on phase, amplitude, distance, unique signatures of the transmit antennas, or other characteristics known to those skilled in the art.

Figure 6:
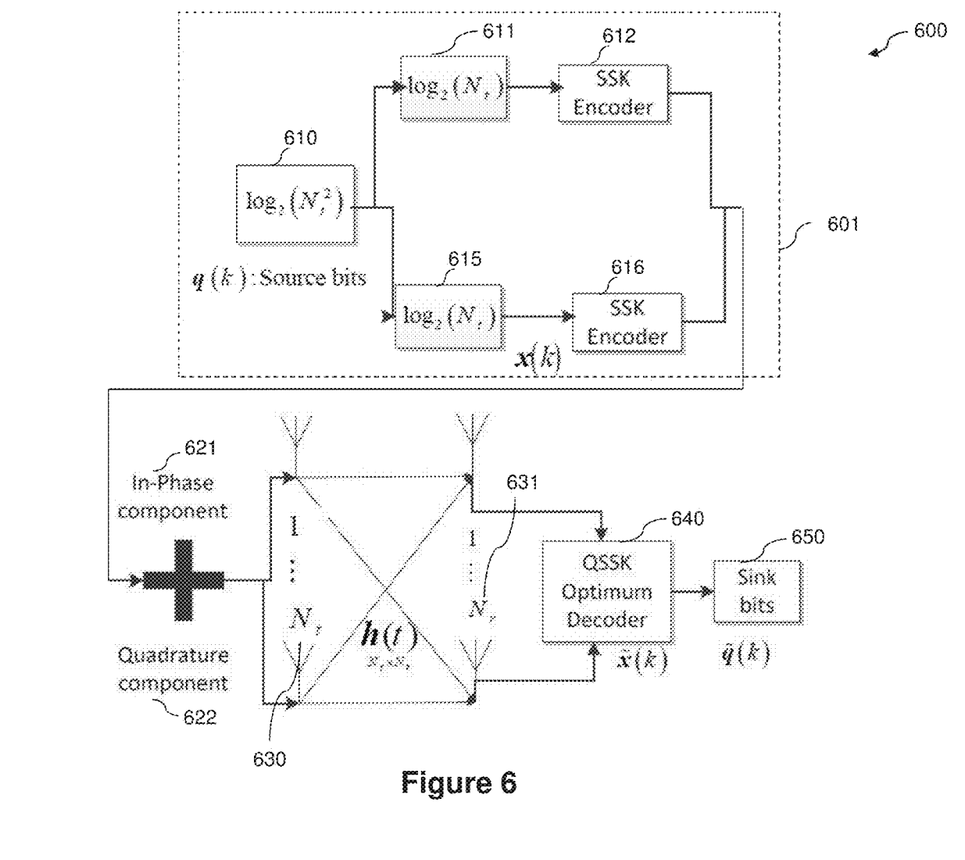
FIG. 6 is a diagrammatic representation illustrating another embodiment of the present invention directed to a system for quadrature space shift keying.

As illustrated in FIG. 6, another embodiment of the present invention may be directed to a system 600 for wireless communication, also referred hereafter as a quadrature space shift keying (QSSK) system. Accordingly, system 600 comprises a transmission unit 601, wherein $$\log_2(N_t^2)$$

source bits 610 to be transmitted, at each time instant or time interval, are first processed and partitioned into two groups comprising $\log_2(N_t)$ bit(s) 611, $\log_2(N_t)$ bit(s) 615.

The two $\log_2(N_t)$ bits 611 and 615 modulate corresponding spatial constellation symbols through SSK encoders 612 and 616 respectively. The spatial constellation symbols may correspond to any one of a plurality of transmit antennas, and may be mapped by the at least one SSK encoder, or otherwise by the transmission unit 601 and/or any appropriate circuitry.

Unlike the prior (QSM) embodiments, the QSSK embodiment of system 600 does not undergo signal modulation. Accordingly, only the spatial constellation or antenna index may be used during transmission in order to relay information, thus fewer information is transmitted as part of the carrier signal which allows for a reduction of detection complexity compared to that of the QSM embodiment.

Accordingly, the real part is transmitted from one transmit antenna among the existing $N_t$ 630 transmit antennas, where the active antenna index is determined by the first $\log_2(N_t)$ bit(s) 611. Similarly, the imaginary part is transmitted by another or the same transmit antenna depending on the other $\log_2(N_t)$ bit(s) 615. Further, the transmitted real and imaginary parts are orthogonal, representing the in-phase 621 and the quadrature 622 components of the carrier signal. The transmission is then received by at least one $N_r$ 631 receiving antenna(s), and is subsequently decoded via the QSSK Optimum Decoder 640 to reconstruct or generate the transmission as sink bits 650, which represent the source bits transmitted at each time interval or instant.

The QSSK systems and methods are further illustrated in the following example(s), which are provided by way of illustration and are not intended to be limiting. It will be appreciated that variations in alternatives in elements of the transmission unit, receiving unit, antennas, and both spatial modulation and signal modulation schemes and their respective constellations and/or constellation symbols will be apparent to those skilled in the art and are within the scope of embodiments of the present invention.

An example is given below, where the following incoming data bits are to be transmitted at one particular time instant or interval via quadrature space shift keying.

$$q = \underbrace{[0 \ 1 \ 1 \ 0]}_{\log_2(N_t^2)}$$

Assume that the above bits are transmitted at one particular time instant using four transmit antennas, each ant1 through ant 4 representing the bits [0, 0], [0 1], [1 0], [1 1], as illustrated in FIG. 2. In conventional SSK, the transmission of the above [0 1 1 0] bits would require either two time slots using 4 transmit antennas, or one time slot using 16 transmit antennas. However, in the present QSSK scheme, these bits may be transmitted in one time slot from only four transmit antennas. Specifically, the first $$\log_2(N_t^2)$$

bits, [0 1], modulate the first active transmit antenna ant2. The first $$\log_2(N_t^2)$$

bits, [1, 0], modulate the second active antenna index ant1. The first antenna will transmit the real symbol, +1, while the second antenna will transmit the imaginary symbol, +j.

Thus, the transmitted QSSK vector from Nt transmit antennas at this particular time instant is given by $s = s_\Re + s_\Im = [0 +1\ 0\ j]^T$.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A quadrature spatial modulation wireless communication method comprising:
   configuring a plurality of transmit antennas to each represent an in-phase spatial constellation symbol within an in-phase spatial constellation, and a quadrature spatial constellation symbol within a quadrature spatial constellation,
   mapping source data to the in-phase spatial constellation symbols and the quadrature spatial constellation symbols represented by the plurality of transmit antennas,
   transmitting, at each of a plurality of time instants, the in-phase spatial constellation symbol represented by a first active antenna of the plurality of transmit antennas concurrently with the quadrature spatial constellation symbol represented by a second active antenna of the plurality of transmit antennas,
   the in-phase spatial constellation symbol and quadrature spatial constellation symbol comprising a carrier signal and further representative of the source data,
   wherein the in-phase spatial constellation symbol and the quadrature spatial constellation symbol are transmitted out of phase,
   receiving the carrier signal using at least one receiving antenna, and
   demodulating the carrier signal in order to generate the source data using at least one receiving unit coupled to the at least one receiving antenna.

2. The method as recited in claim 1 wherein the in-phase spatial constellation symbol and the quadrature spatial constellation symbol are out of phase by 90 degrees.

3. The method as recited in claim 1 wherein the in-phase component and the quadrature component are each separately transmitted on a cosine part and a sine part of a carrier wave at each of the time instants.

4. The method as recited in claim wherein the plurality of antennas comprises $N_t$ transmit antennas having a first active antenna index determined by $\log_2(N_t)$ bits forming the in-phase spatial constellation symbol, and a second active antenna index determined by another $\log_2(N_t)$ bits forming the quadrature spatial constellation symbol.

5. A quadrature spatial modulation wireless communication system comprising:
   a plurality of transmit antennas configured in a spaced apart configuration:
   each of said plurality of transmit antennas being representative of an in-phase spatial constellation point within an in-phase spatial constellation, and a quadrature spatial constellation point within a quadrature spatial constellation,
   at least one transmission unit configured to:
   map source data to the in-phase spatial constellation point and the quadrature spatial constellation point represented by at least two of said plurality of transmit antennas,
   transmit, at each of a plurality of time instants, the in-phase spatial constellation point represented by a first active antenna,
   transmit, at each of the plurality of time instants, the quadrature spatial constellation point represented by a second active antenna,
   the in-phase spatial constellation point and the quadrature spatial constellation point comprising a carrier signal,
   wherein the in-phase spatial constellation point and the quadrature spatial constellation point are transmitted out of phase,
   at least one receiving antenna configured to receive said carrier signal, and
   at least one receiving unit coupled to said at least one receiving antenna, said at least one receiving unit being configured to demodulate said carrier signal in order to generate the source data.

6. The system as recited in claim 5 wherein the in-phase spatial constellation symbol and the quadrature spatial constellation symbol are out of phase by 90 degrees.

7. The system as recited in claim 5 wherein the in-phase component and the quadrature component are each separately transmitted on a cosine part and sine part of a carrier wave at each of the time instants.

8. The system as recited in claim 5 wherein the plurality of antennas comprises $N_t$ transmit antennas having a first active antenna index determined by $\log_2(N_t)$ bits forming the in-phase spatial constellation point, and a second active antenna index determined by another $\log_2(N_t)$ bits forming the quadrature spatial constellation point.

9. A quadrature spatial modulation wireless communication method comprising:
   configuring $N_t$ transmit antennas to represent:
   a first active antenna index determined by $\log_2(N_t)$, bits forming an in-phase spatial constellation symbol comprising $N_t$ in-phase spatial constellation symbols, and
   a second active antenna index determined by another $\log_2(N_t)$ bits forming a quadrature spatial constellation symbol comprising $N_t$ quadrature-spatial constellation symbols,
   mapping $$\log_2(N_t^2)$$

bits to the first active antenna index and the second active antenna index,
   transmitting, at each of a plurality of time instants, the in-phase spatial constellation symbol from the first active antenna index,
   transmitting, at each of the plurality of time instants, the quadrature spatial constellation symbol from the second active antenna index representative of a portion of the $$\log_2(N_t^2)$$

bits,
   wherein the in-phase spatial constellation symbol and the quadrature spatial constellation symbol are each separately transmitted on a cosine part and a sine part of the carrier wave at each of the time instants,
   receiving the carrier signal using an $N_r$ receiving antennas, and demodulating the carrier signal in order to generate the portion of the $$\log_2(N_t^2)$$

bits received at each time instant.

10. The quadrature spatial modulation wireless communication method as recited in claim 9 wherein $$\log_2(N_t^2 M)$$

source bits are transmitted at each of said plurality of time instants, $\log_2(M)$ bits being utilized to modulate at least one of the spatial constellation symbols according to M quadrature amplitude modulation.

11. The quadrature spatial modulation wireless communication method as recited in claim 9 wherein $$\log_2(N_t^2 M)$$

source bits are transmitted at each of said plurality of time instants, $\log_2(M)$ bits being utilized to modulate at least one of the spatial constellation symbols according to M phase shift keying.

12. The quadrature spatial modulation wireless communication method as recited in claim 9 wherein $$\log_2(N_t^2 M)$$

source bits are transmitted at each of said plurality of time instants, $\log_2(M)$ bits being utilized to modulate at least one of the spatial constellation symbols according to a predetermined complex constellation diagram.

13. The quadrature spatial modulation wireless communication method as recited in claim 9 wherein the first active antenna index and the second active antenna index collectively comprise a single transmit antenna.

14. The quadrature spatial modulation wireless communication method as recited in claim 9 wherein the first active antenna index and the second active antenna index each separately comprise individual transmit antennae.

* * * * *

UNITED STATES PATENT AND TRADEMARK OFFICE
CERTIFICATE OF CORRECTION

PATENT NO. : 9,813,278 B1
APPLICATION NO. : 14/972379
DATED : November 7, 2017
INVENTOR(S) : Raed Mesleh, Salama Ikki and El-Hadi M. Aggoune It is certified that error appears in the above-identified patent and that said Letters Patent is hereby corrected as shown below:

On the Title Page

Item (72) the spelling of the First Joint Inventor's first name is hereby corrected from "Meslelh" to "Mesleh".

Signed and Sealed this
Sixth Day of March, 2018

Andrei Iancu
*Director of the United States Patent and Trademark Office*